Feb. 12, 1929.
E. E. BARTELS
FLOAT
Filed Aug. 26, 1926
1,701,967
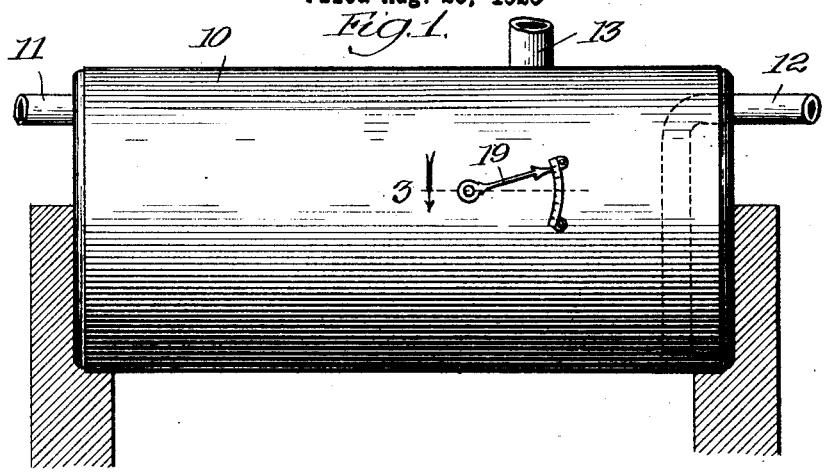
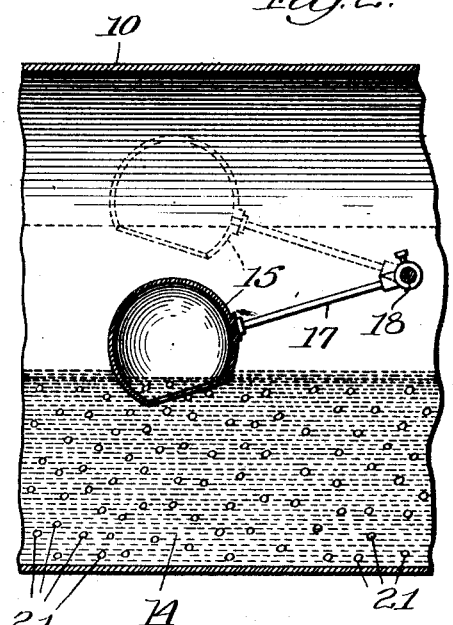
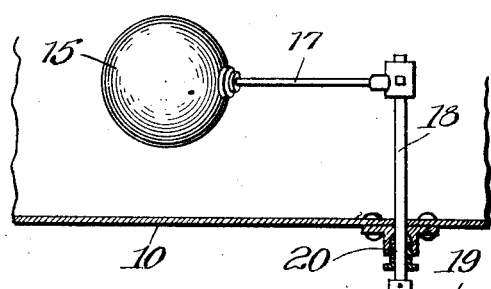
Inventors:
Edward E. Bartels,
By Dyrenforth, Lee, Chritton & Wiles,
Attys.

Patented Feb. 12, 1929.

1,701,967

UNITED STATES PATENT OFFICE.

EDWARD E. BARTELS, OF WHITING, INDIANA, ASSIGNOR TO STANDARD OIL COMPANY, OF WHITING, INDIANA, A CORPORATION OF INDIANA.

FLOAT.

Application filed August 26, 1926. Serial No. 131,644.

This invention relates to improvements in floats, and more especially a float adapted for use in a container or tank with internal pressure.

For example, in the cracking, distillation, or other treatment of oils, it is frequently necessary or desirable to provide a float in one of the tanks, such as a still, or vapor separator, for the purpose of indicating the height of the liquid therein, or for operating a valve. In such containers there is frequently quite high pressure; and consequently a hollow hermetically sealed float for use therein must be made strong and rigid enough to resist the crushing effect of the pressure. Such a float, obviously, is quite heavy and, therefore, a counterbalance is usually provided to give the requisite buoyancy. The making of such a float of requisite strength and necessary counterbalance, obviously, adds to the cost of the same.

By the use of my invention, the float may be made of relatively thin and weak material and a counterbalance may be dispensed with. By the use of my invention, also, the difficulty and expense of keeping the float liquid tight is dispensed with.

In general, my invention contemplates the making of a float open at the bottom. As will be described more in detail hereinafter, means are provided for preventing the float from becoming filled with liquid and thus impairing its buoyancy; or else, the gases formed in the liquid itself are utilized for this purpose.

In that form of device embodying the features of my invention shown in the accompanying drawings, Fig. 1 is a view in side elevation of a container such as, for example, an oil still, with my improved float inside, Fig. 2 is a vertical sectional view taken through the float, and Fig. 3 is a top plan view of the float.

As shown in the drawings, 10 indicates a container which, for example, may be an oil still in the cracking of oil. This tank or container may be provided with a usual inlet pipe 11, oil outlet 12 and gas outlet 13. The oil in the tank 10 is indicated by 14.

15 indicates a hollow float which may be used for indicating the height of oil in the tank as shown, or for other purposes. This float is substantially spherical in form with a round opening 16 at the bottom. The float 15 is mounted on a rod 17 fastened to a shaft 18 extending through the side wall of the tank 10 and carrying on its outer end an indicating arrow 19 to show the position of the float inside. 20 indicates a packing box of any usual form in order to make the tight joint where the rod 18 passes through the tank 10 and permits rotation of the same.

It is obvious that if the float 15 should become filled with liquid, that its buoyancy would be impaired. In installations such as, for example, stills, where in operation gases are continually being formed in the liquid, such gases may be utilized to keep the float 15 sufficiently filled with gas. For example, as shown in Fig. 2, 21, 21 indicate bubbles of gas being formed in the liquid 14 and rising. These bubbles being formed under the opening 16 in the float 15 will rise and escape into the float thus keeping the float substantially filled with gas.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim is new, and desire to secure by Letters Patent, is:

1. In combination with a container partly filled with liquid being heated and giving off a substantially non-condensable gas, a hollow float in said container floating on said liquid, said float having an opening in the bottom thereof, some of the gas being given off by said liquid passing upwardly through said opening into the interior of said float and serving to keep said float substantially completely filled with said gas.

2. In an oil cracking still partly filled with liquid being heated and giving off gases, a hollow float in said still floating on the liquid, said float having an opening in the bottom thereof, some of the gas being given off by said liquid passing upwardly through said opening into the interior of said float and serving to keep said float substantially completely filled with said gas.

In witness whereof, I have hereunto set my hand this 20th day of August A. D. 1926.

EDWARD E. BARTELS.